(12) United States Patent
Ou et al.

(10) Patent No.: US 11,686,669 B2
(45) Date of Patent: Jun. 27, 2023

(54) OPTICAL MEASUREMENT DEVICE INCLUDING A LIGHT SPLITTING MODULE COMPRISING LIGHT SPLITTERS AND A LIGHT INSPECTING MODULE COMPRISING A PLURALITY OF INSPECTING CAMERAS

(71) Applicants: Tsung-Hsien Ou, Taoyuan (TW);
 Hsin-Yueh Sung, Taoyuan (TW);
 Shih-Min Hsu, Taoyuan (TW);
 Yu-Hsuan Lin, Taoyuan (TW)

(72) Inventors: Tsung-Hsien Ou, Taoyuan (TW);
 Hsin-Yueh Sung, Taoyuan (TW);
 Shih-Min Hsu, Taoyuan (TW);
 Yu-Hsuan Lin, Taoyuan (TW)

(73) Assignee: Chroma ATE Inc., Taoyuan (TW)

( * ) Notice: Subject to any disclaimer, the term of this patent is extended or adjusted under 35 U.S.C. 154(b) by 0 days.

(21) Appl. No.: 17/748,084

(22) Filed: May 19, 2022

(65) Prior Publication Data
 US 2022/0381676 A1 Dec. 1, 2022

(30) Foreign Application Priority Data
 May 28, 2021 (TW) .................................. 110119320

(51) Int. Cl.
 G02B 27/10 (2006.01)
 G01N 21/25 (2006.01)
 G02B 27/14 (2006.01)
 G01N 21/27 (2006.01)

(52) U.S. Cl.
 CPC ........... *G01N 21/255* (2013.01); *G01N 21/27* (2013.01); *G02B 27/1013* (2013.01); *G02B 27/141* (2013.01)

(58) Field of Classification Search
 CPC .. G01N 21/255; G01N 21/27; G02B 27/1013; G02B 27/141; G02B 27/10; G01J 3/0205; G01J 3/0229
 USPC ......................................................... 250/216
 See application file for complete search history.

(56) References Cited

U.S. PATENT DOCUMENTS 8,273,567 B2 * 9/2012 Ko ......................... G01N 21/78
 356/318

* cited by examiner

*Primary Examiner* — Que Tan Le
*Assistant Examiner* — Mai Thi Ngoc Tran

(57) ABSTRACT

The invention provides an optical measurement device for measuring light to be inspected. The optical measurement device comprises a light receiving module, a light splitting module, and a plurality of color filters. The light receiving module is used for converting the light to be inspected into a first parallel light. The light splitting module is used for splitting the first parallel light into a plurality of parallel lights to be inspected. Each color filter receives at least one of the plurality of parallel lights to be inspected. The plurality of parallel lights to be inspected filtered by the plurality of color filters are used to calculate tristimulus values in the CIE color space.

9 Claims, 4 Drawing Sheets

OPTICAL MEASUREMENT DEVICE INCLUDING A LIGHT SPLITTING MODULE COMPRISING LIGHT SPLITTERS AND A LIGHT INSPECTING MODULE COMPRISING A PLURALITY OF INSPECTING CAMERAS

CROSS REFERENCE TO RELATED APPLICATION

The present application claims priority to Taiwan patent application Serial No. 110119320 filed on May 28, 2021, the entire content of which is incorporated by reference to this application.

BACKGROUND OF THE INVENTION

1. Field of the Invention

The present invention pertains to an optical measurement device, more specifically to an optical measurement device to increase the usage rate of the light.

2. Description of the Prior Art

Generally speaking, before a display device of various sizes leaves the factory, various tests are required to determine whether the display device can function normally. For example, the display device may have a color temperature deviation due to defects in the manufacturing process, so these display problems need to be picked out during the testing processes. However, in the traditional testing processes for inspecting display devices, a traditional optical measurement device shown in FIG. 1 or FIG. 2 is often used to split and filter the light to be inspected into different colors, and use the filtered light to calculate tristimulus values in the XYZ color space defined by the International Commission on Illumination (CIE). Please refer to FIG. 1, FIG. 1 is a diagram of a traditional optical measurement device. As shown in FIG. 1, the optical measurement device 9a has a condenser lens 90, an optical diffusion sheet 91a, and a plurality of inspecting camera 92-94. In practice, the condenser lens 90 receives the light to be inspected from the DUT (object to be tested) and focuses the light to be inspected on the optical diffusion sheet 91a, and then the optical diffusion sheet 91a disperses the light to be inspected. Next, the dispersed light to be inspected is received by a plurality of inspecting cameras 92-94 at fixed positions for calculating tristimulus values accordingly.

Person having ordinary skill in the art can know that the light to be inspected dispersed by the optical diffusion sheet 91a is projected on a wide area, and the plurality of inspecting cameras 92-94 can only receive a part of the dispersed light. Most of the dispersed light cannot be used, that is, the usage rate of the light is not good enough. In other words, when the light to be inspected is weak, the optical measurement device 9a may not be able to correctly calculate the tristimulus value due to insufficient light received by the plurality of inspecting cameras 92-94. However, there is another optical measurement device in the industry to improve the usage rate of the light. Please refer to FIG. 2, FIG. 2 is a diagram of another traditional optical measurement device. Similar to FIG. 1, the optical measurement device 9b in FIG. 2 also has a condenser lens 90, and a plurality of inspecting cameras 92-94, and the condenser lens 90 also receives the light to be inspected from the DUT. In this case, the optical measurement device 90b replaces the optical diffusion sheet 91a with an optical fiber unit 91b, so that the condenser lens 90 can focus the light to be inspected to one end of the optical fiber unit 91b, and the optical fiber unit 91b directly splits the light to be inspected to the plurality of inspecting cameras.

Although the optical measurement device 9b of FIG. 2 can improve the usage rate of the light by using the optical fiber unit 91b, there is still a certain proportion of the light to be inspected that cannot enter the optical fiber unit 91b and the plurality of inspecting cameras 92-94. The reason may be referred to FIG. 3, which is a cross section at one end of the traditional optical fiber unit. As shown in FIG. 3, the optical fiber unit 91b is composed of a plurality of optical fibers 910, and each optical fiber 910 can transmit a small part of the light to be inspected to one of the plurality of inspecting cameras 92-94. In practice, because the optical fibers 910 still have structural limitations (for example, there shall be one or more protection layer covers the optical fibers 910, and the shape of the cross section is circular), it is impossible to achieve seamless arrangement between the optical fibers 910. In other words, person having ordinary skill in the art can understand that even if the optical measurement device 9b in FIG. 2 is used, a part of the light to be inspected cannot enter the optical fibers 910 and cannot reach the plurality of inspecting cameras 92-94. In addition, the optical measurement device 9b also has the problem that the light to be inspected cannot be accurately (or evenly) distributed to the plurality of inspecting cameras 92-94. For example, the optical fibers 910 in the center of the optical fiber unit 91b may receive more light than the optical fibers 910 in the periphery.

Accordingly, the industry needs a new optical measurement device, which can not only improve the usage rate of the light, but also have better uniformity of the light to be inspected received by each inspecting camera.

SUMMARY OF THE INVENTION

The present invention provides an optical measurement device, which can first convert the light to be inspected into parallel light, and then use a light splitter to split the light to be inspected to different inspecting cameras, thereby improving the light usage rate of the light to be inspected. And ensure the uniformity of the light to be inspected.

The present invention provides an optical measurement device for measuring light to be inspected. The optical measurement device comprises a light receiving module, a light splitting module, and a light inspecting module. The light receiving module converts the light to be inspected into a first parallel light. The light splitting module comprises a first light splitter and a second light splitter. The light inspecting module comprises a plurality of inspecting cameras. The first light splitter splits the first parallel light into a second parallel light and a third parallel light, and the second light splitter splits the second parallel light into a fourth parallel light and a fifth parallel light. The third parallel light, the fourth parallel light, and the fifth parallel light are projected to one of the plurality of inspecting cameras respectively.

In some embodiments, the light receiving module may have a first lens, a light expander, and a second lens. The first lens may be used for receiving the light to be inspected, and the light expander may be used for collimating and expanding the light to be inspected focused by the first lens, and the second lens may be used to convert the light to be inspected, which is collimated and expanded, into the first parallel light. Besides, a first inspecting camera, a second inspecting camera, and a third inspecting camera may be defined among the plurality of inspecting cameras, the first inspecting camera may be used for receiving the third parallel light, the second inspecting camera may be used for receiving the fourth parallel light, and the third inspecting camera may be used for receiving the fifth parallel light. In addition, the light intensity of the second parallel light may equal to n times the light intensity of the third parallel light, the light intensity of the fourth parallel light may equal to m times the light intensity of the fifth parallel light, where n and m are positive numbers not greater than 3. Moreover, the first inspecting camera may be provided with a red light filter, the second inspecting camera may be provided with a green light filter, and the third inspecting camera may be provided with a blue light filter.

The present invention also provides an optical measurement device for measuring light to be inspected. The optical measurement device comprises a light receiving module, a light splitting module, and a plurality of color filters. The light receiving module converts the light to be inspected into a first parallel light. The light splitting module splits the first parallel light into a plurality of parallel lights to be inspected. Each color filter receives at least one of the plurality of parallel lights to be inspected. Wherein the plurality of parallel lights to be inspected filtered by the plurality of color filters are used to calculate tristimulus values in the CIE color space.

In some embodiments, the plurality of color filters may comprise a red light filter, a green light filter, and a blue light filter, and the parallel light to be inspected passed through the green light filter has the highest light intensity among all of the plurality of parallel lights to be inspected. Alternatively, the plurality of parallel lights to be inspected may have the same light intensity.

To sum up, the optical measurement device provided by the present invention can convert the light to be inspected into parallel light, so that the light to be inspected can have better uniformity. In addition, in order to improve the usage rate of the light to be inspected, the optical measurement device provided by the present invention splits the light to redirect the light to be inspected to different inspecting cameras. Also, the optical measurement device reduces the leakage or loss of the light to be inspected, the measuring accuracy and sensitivity can be greatly improved.

BRIEF DESCRIPTION OF THE APPENDED DRAWINGS

DETAILED DESCRIPTION OF THE INVENTION

The features, objections, and functions of the present invention are further disclosed below. However, it is only a few of the possible embodiments of the present invention, and the scope of the present invention is not limited thereto; that is, the equivalent changes and modifications done in accordance with the claims of the present invention will remain the subject of the present invention. Without departing from the spirit and scope of the invention, it should be considered as further enablement of the invention.

Figure 1:
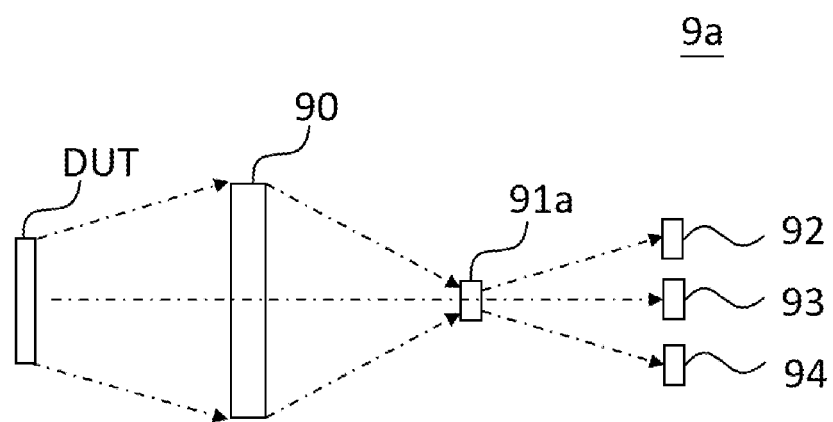
FIG. 1 is a diagram of a traditional optical measurement device.
Figure 2:
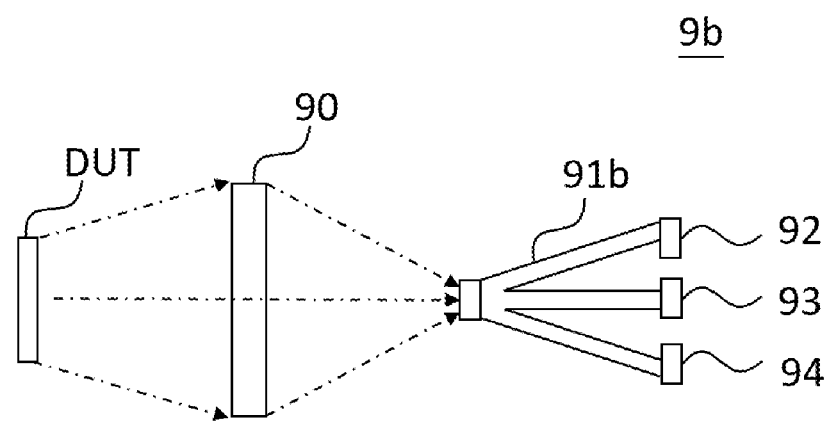
FIG. 2 is a diagram of another traditional optical measurement device.
Figure 3:
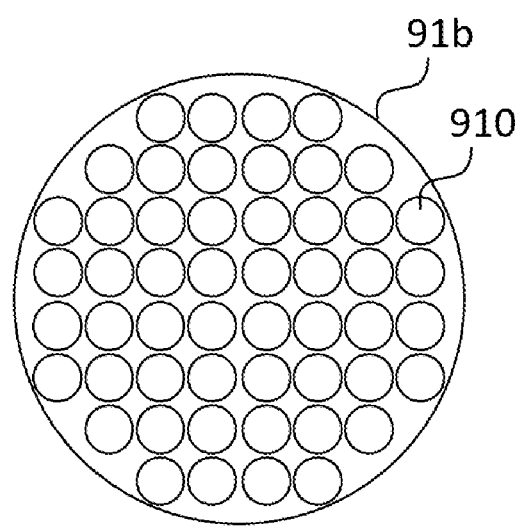
FIG. 3 is a cross section of a traditional optical fiber.
Figure 4:
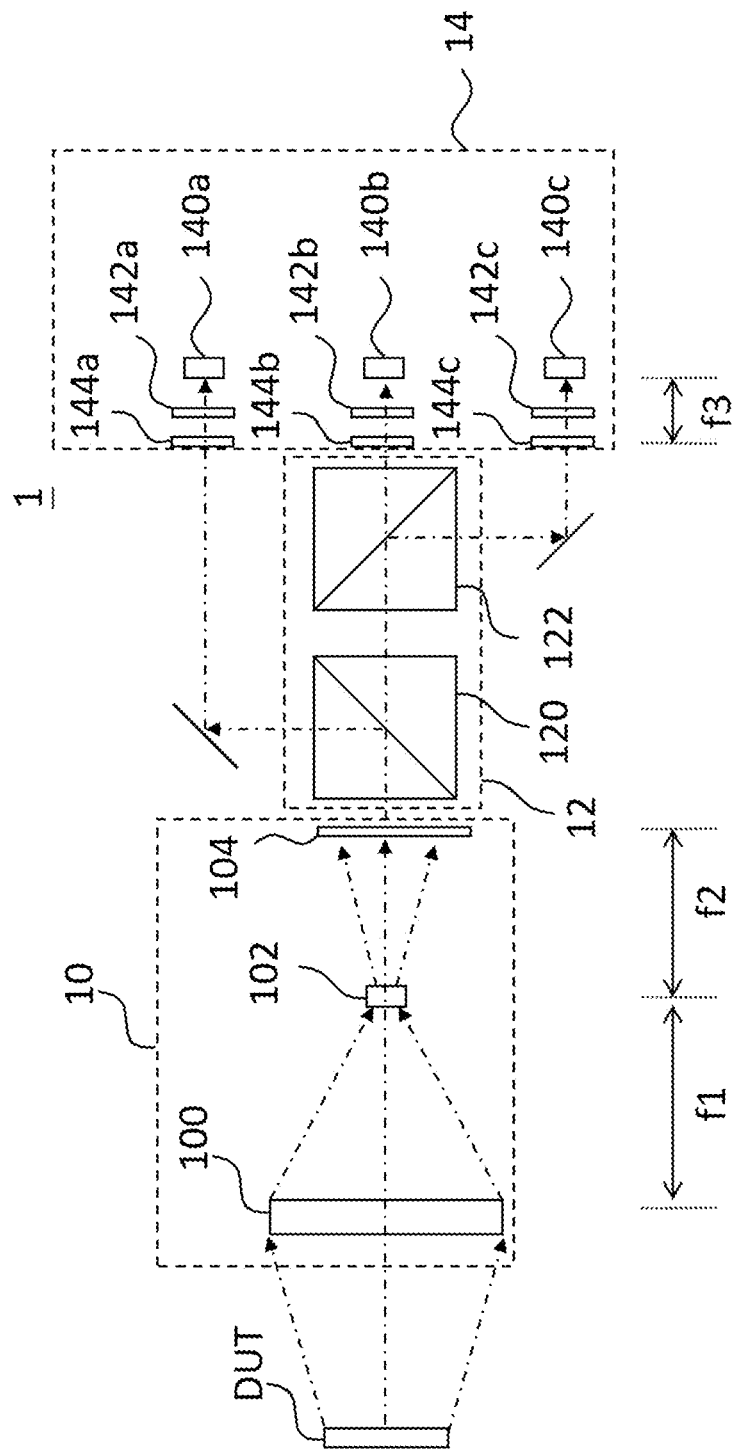
FIG. 4 is a diagram of an optical measurement device according to an embodiment of the present invention.

Please refer to FIG. 4, FIG. 4 is a diagram of an optical measurement device according to an embodiment of the present invention. As shown in FIG. 4, the optical measurement device 1 can be used to measure the light to be inspected generated by the DUT, and the optical measurement device 1 can have a light receiving module 10, a light splitting module 12 and a light inspecting module Group 14. In one example, the light receiving module 10 may be aligned with a light emitting surface of the DUT, and the light receiving module 10 may have a first lens 100, a light expander 102, and a second lens 104. The first lens 100, the light expander 102, and the second lens 104 are arranged in the same optical path, and the first lens 100 and the second lens 104 may both be a convex lens. The distance f1 between the first lens 100 and the light expander 102 may be approximately equal to the focal length of the first lens 100, and the distance f2 between the light expander 102 and the second lens 104 may be approximately equal to the focal length of the second lens 104.

In practice, after the first lens 100 receives the light to be inspected from the DUT, the light to be inspected may focus onto the light expander 102 at the focus of the first lens 100. The light expander 102 may be an element used to diffuse the light, and is used to expand the light to be inspected after being focused by the first lens 100. Next, because the light expander 102 is at the focus of the second lens 104, the second lens 104 can convert the expanded light to be inspected from the light expander 102 into parallel light. In this embodiment, the light that leaves the second lens 104 (the light to be inspected with the characteristic of parallel light) is called the first parallel light.

The light splitting module 12 is disposed behind the light receiving module 10, and the light splitting module 12 has a first light splitter 120 and a second light splitter 122. The first light splitter 120 in this embodiment receives the first parallel light leaving the second lens 104, and can split the first parallel light into two lights, one of which, defined as the second parallel light, projects towards the second light splitter 122, the other light, defined as the third parallel light, leaves the light splitting module 12 (for example, toward the upper part of FIG. 4). Next, the function of the second light splitter 122 is similar to that of the first light splitter 120. After the second light splitter 122 receives the second parallel light, the second light splitter 122 further splits the second parallel light into two lights, both of which will be leaving the light splitting module 12, one of which, defined as the fourth parallel light, is directed to the right of FIG. 4, and the other light, defined as the fifth parallel light, is directed to the bottom of FIG. 4. That is to say, the light splitting module 12 of this embodiment can split the light to be inspected into three beams which are the third parallel light, the fourth parallel light, and the fifth parallel light.

The light inspecting module 14 is disposed behind the light splitting module 12, and may have a plurality of inspecting cameras (the inspecting cameras 140a-140c) for receiving the light leaving the light splitting module 12. As mentioned above, the lights leaving the light splitting module 12 are the third parallel light, the fourth parallel light, and the fifth parallel light, which may be respectively received by the inspecting camera 140a, the inspecting camera 140b, and the inspecting camera 140c. Here, the third parallel light, the fourth parallel light, and the fifth parallel light may also be referred to as a plurality of parallel lights to be inspected. Although FIG. 4 shows that the third parallel light and the fifth parallel light are respectively directed to the inspecting camera 140a and the inspecting camera 140c through the reflector m (mirror). Person having ordinary skill in the art should understand that the reflector m is not one of the necessary components, the optical measurement device 1 of this embodiment can also realize all the functions without the reflector m.

In one example, each inspecting camera in the light inspecting module 14 may also correspond to a color filter and a lens. For example, the inspecting camera 140a may correspond to the color filter 142a and the lens 144a, the inspecting camera 140b may correspond to the color filter 142b and the lens 144b, and the inspecting camera 140c may correspond to the color filter 142c and the lens 144c. The functions of the lenses 144a-144c can be the same and have the same focal length, and each inspecting camera is set at the focus of the corresponding lens. Taking the lens 144a as an example, the distance f3 between the inspecting camera 140a and the lens 144a should be exactly the focal length of the lens 144a. In practice, the parallel light (the third parallel light) projects toward the lens 144a, and the lens 144a can focus the third parallel light onto the inspecting camera 140a. In addition, this embodiment does not limit the position of the color filter as long as the position is located between the inspecting camera and the lens. For example, the color filters 142a-142c may correspond to red, green or blue filters, respectively.

It is worth mentioning that the first light splitter 120 and the second light splitter 122 can have different light splitting ratios, and the light splitting ratios can be changed according to the required light components of red, green, or blue. In an example, the color filter 142a may correspond to a green filter, the color filter 142b may correspond to a red filter, and the color filter 142c may correspond to a blue filter. Generally, in the CIE color space, the values of X, Y and Z may roughly correspond to red, green, and blue, that is, after passing through the color filter 142a, the values measured by the inspecting camera 140a may roughly correspond to the Y value. Similarly, after passing through the color filter 142b and the color filter 142c, the values measured by the inspecting camera 140b and the inspecting camera 140c can roughly correspond to the X value and the Z value, respectively. Assuming that the inspecting cameras 140a-140c are expected to receive substantially the same amount of light, the ratio of reflection to transmission of the first light splitter 120 can be set to 1:2, and the ratio of transmission to reflection of the second light splitter 122 can be set to 1:1. At this time, since the ratio of transmission to reflection of the first light splitter 120 is 2:1, the light intensity of the transmitted second parallel light should be twice the light intensity of the reflected third parallel light. Also, since the ratio of transmission to reflection of the second light splitter 122 is 1:1, the light intensity of the transmitted fourth parallel light is substantially the same as the light intensity of the reflected fifth parallel light. In other words, the light intensities of the third parallel light, the fourth parallel light, and the fifth parallel light are approximately the same.

For another example, the brightness may be regarded as an important parameter in some tests, since the brightness is more related to the Y value, person having ordinary skill in the art can understand that the detection result of the inspecting camera 140a is relatively important. In this case, the ratio of reflection to transmission of the first light splitter 120 can be adjusted to 1:1, and the ratio of transmission to reflection of the second light splitter 122 can still be 1:1. Under this setting, the light intensity of the fourth parallel light and the fifth parallel light is still the same, but the light intensity of the third parallel light will be twice the light intensity of the fourth parallel light and the fifth parallel light. It can be seen from the above that the present embodiment can selectively adjust the light splitting ratio of the first light splitter 120 and the second light splitter 122 according to different measurement requirements. In practice, the ratio of reflection to transmission of the first light splitter 120 may be 1:0.5, 1:1, 1:1.5, 1:2 or 1:3, and the ratio of reflection to transmission of the second light splitter 122 may also be 1:0.5, 1:1, 1:1.5, 1:2 or 1:3, which is not limited in this embodiment.

To sum up, the optical measurement device provided by the present invention can convert the light to be inspected into parallel light, so that the light to be inspected can have better uniformity. In addition, in order to improve the usage rate of the light to be inspected, the optical measurement device provided by the present invention splits the light to redirect the light to be inspected to different inspecting cameras. Also, the optical measurement device reduces the leakage or loss of the light to be inspected, the measuring accuracy and sensitivity can be greatly improved.

What is claimed is:

1. An optical measurement device, for measuring light to be inspected, comprising:
    a light receiving module for converting the light to be inspected into a first parallel light;
    a light splitting module comprising a first light splitter and a second light splitter; and
    a light inspecting module comprising a plurality of inspecting cameras;
    wherein the first light splitter splits the first parallel light into a second parallel light and a third parallel light, and the second light splitter splits the second parallel light into a fourth parallel light and a fifth parallel light;
    wherein the third parallel light, the fourth parallel light, and the fifth parallel light are projected to one of the plurality of inspecting cameras respectively.

2. The optical measurement device according to claim 1, wherein the light receiving module comprises a first lens, a light expander, and a second lens, the first lens is used for receiving the light to be inspected, and the light expander is used for collimating and expanding the light to be inspected focused by the first lens, and the second lens is used to convert the light to be inspected, which is collimated and expanded, into the first parallel light.

3. The optical measurement device according to claim 1, wherein a first inspecting camera, a second inspecting camera, and a third inspecting camera are defined among the plurality of inspecting cameras, the first inspecting camera is used for receiving the third parallel light, the second inspecting camera is used for receiving the fourth parallel light, and the third inspecting camera is used for receiving the fifth parallel light.

4. The optical measurement device according to claim 3, wherein the light intensity of the second parallel light equals to n times the light intensity of the third parallel light, where n is a positive number not greater than 3.

5. The optical measurement device according to claim 4, wherein the light intensity of the fourth parallel light equals to m times the light intensity of the fifth parallel light, where m is a positive number not greater than 3.

6. The optical measurement device according to claim 5, wherein the first inspecting camera is provided with a red light filter, the second inspecting camera is provided with a green light filter, and the third inspecting camera is provided with a blue light filter.

7. An optical measurement device, for measuring light to be inspected, comprising:

a light receiving module for converting the light to be inspected into a first parallel light;
a light splitting module for splitting the first parallel light into a plurality of parallel lights to be inspected; and
a plurality of color filters;
wherein the each color filter receives at least one of the plurality of parallel lights to be inspected;
wherein the plurality of parallel lights to be inspected filtered by the plurality of color filters are used to calculate tristimulus values in the CIE color space.

8. The optical measurement device according to claim 7, wherein the plurality of color filters comprises a red light filter, a green light filter, and a blue light filter, and the parallel light to be inspected passed through the green light filter has the highest light intensity among all of the plurality of parallel lights to be inspected.

9. The optical measurement device according to claim 7, wherein the plurality of parallel lights to be inspected have the same light intensity.

* * * * *